US009922554B2

(12) United States Patent
Mikuni et al.

(10) Patent No.: US 9,922,554 B2
(45) Date of Patent: Mar. 20, 2018

(54) DRIVING ENVIRONMENT RISK DETERMINATION APPARATUS AND DRIVING ENVIRONMENT RISK NOTIFICATION APPARATUS

(71) Applicant: SUBARU CORPORATION, Tokyo (JP)

(72) Inventors: Tsukasa Mikuni, Tokyo (JP); Koichi Mizutani, Tokyo (JP); Yusuke Hamada, Tokyo (JP); Takahito Suzuki, Tokyo (JP); Hideki Sato, Tokyo (JP); Hidemichi Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/816,583

(22) Filed: Aug. 3, 2015

(65) Prior Publication Data

US 2016/0035222 A1 Feb. 4, 2016

(30) Foreign Application Priority Data

Aug. 4, 2014 (JP) ................................ 2014-158435
Aug. 4, 2014 (JP) ................................ 2014-158436
Apr. 6, 2015 (JP) ................................ 2015-077986

(51) Int. Cl.
*G06F 19/00* (2011.01)
*G06G 7/70* (2006.01)
(Continued)

(52) U.S. Cl.
CPC ......... *G08G 1/0137* (2013.01); *G08G 1/0962* (2013.01)

(58) Field of Classification Search
CPC ..... G08G 1/0137; G08G 1/0962; G08G 1/037
(Continued)

(56) References Cited

U.S. PATENT DOCUMENTS

2008/0077312 A1* 3/2008 Mrotek .................... G08G 1/04 701/117
2008/0231703 A1* 9/2008 Nagata .................. H04N 7/181 348/148

(Continued)

FOREIGN PATENT DOCUMENTS

CN 103198685 A 7/2013
JP 2000-067396 A 3/2000

(Continued)

OTHER PUBLICATIONS

Notification of Reasons for Refusal Japanese Patent Application No. 2015-077986 dated Mar. 22, 2016 with full translation.

(Continued)

*Primary Examiner* — Aaron L Troost
*Assistant Examiner* — Paula L Schneider
(74) *Attorney, Agent, or Firm* — McDermott Will & Emery LLP

(57) ABSTRACT

A driving environment risk determination apparatus includes a driver status acquisition module that acquires a status of a driver who drives another vehicle running in the vicinity of a subject vehicle that is equipped with the driving environment risk determination apparatus, an other-vehicle status acquisition module that acquires a driving status of the another vehicle, a driving environment acquisition module that acquires a driving environment in the vicinity of the subject vehicle, a risk determination module that calculates a degree of risk from information acquired through the driver status acquisition module, the other-vehicle status acquisition module, and the driving environment acquisition module and thereby determines whether the degree of risk is minor or major.

19 Claims, 5 Drawing Sheets

(51) Int. Cl.

| | |
|---|---|
| ***G06G 7/76*** | (2006.01) |
| ***G08G 1/00*** | (2006.01) |
| ***G08G 1/01*** | (2006.01) |
| ***G08G 1/0962*** | (2006.01) |

(58) Field of Classification Search
USPC .......................................................... 701/117
See application file for complete search history.

(56) References Cited

U.S. PATENT DOCUMENTS

| | | | | |
|---|---|---|---|---|
| 2013/0144459 | A1* | 6/2013 | Ricci | G06F 9/54 701/1 |
| 2014/0132407 | A1* | 5/2014 | Kumai | G08G 1/0962 340/439 |
| 2015/0279215 | A1* | 10/2015 | Shibata | G08G 1/166 340/435 |

FOREIGN PATENT DOCUMENTS

| | | | | |
|---|---|---|---|---|
| JP | 2002-025000 A | | 1/2002 | |
| JP | 2006-151114 A | | 6/2006 | |
| JP | 2008-065480 A | | 3/2008 | |
| JP | 2009-040107 A | | 2/2009 | |
| JP | 2010-044632 A | | 2/2010 | |
| JP | 2010-108344 A | | 5/2010 | |
| JP | 2010-247656 | * | 11/2010 | B60R 16/02 |
| JP | 2010-247656 A | | 11/2010 | |
| JP | 2011-014097 A | | 1/2011 | |
| JP | 2012-155535 A | | 8/2012 | |

OTHER PUBLICATIONS

Chinese Office Action dated Apr. 19, 2017, issued in Chinese Patent Application No. 201510467589.0. (w/ machine translation).

* cited by examiner

DRIVING ENVIRONMENT RISK DETERMINATION APPARATUS AND DRIVING ENVIRONMENT RISK NOTIFICATION APPARATUS

CROSS-REFERENCE TO RELATED APPLICATIONS

The present application claims priority from Japanese Patent Applications No. 2014-158435 filed on Aug. 4, 2014, 2014-158436 filed on Aug. 4, 2014 and 2015-077986 filed on Apr. 6, 2015, the entire contents of which are hereby incorporated by reference.

BACKGROUND

1. Technical Field

The present invention relates to a driving environment risk determination apparatus that determines from the situation of a vehicle equipped with the apparatus and another vehicle the degree of risk of an environment in which the vehicle equipped with the apparatus is running and relates to a driving environment risk notification apparatus.

2. Related Art

In order to improve traffic conditions and safety of vehicles such as automobiles, research and development of an Intelligent Transport System (ITS) has recently been underway for the sophistication of navigation systems, safe driving assistance, optimization of traffic management, and improvement to road management efficiency.

In addition, there has also been developed an Advanced Safety Vehicle (ASV) as an automobile compatible with the ITS that is equipped with various sensors and other information recognition systems for collecting various pieces of information about the surrounding driving environment and road conditions and the like and supports a driver's safe driving based on thus collected information and other recognition results.

In the field of ASVs, various technologies have been reviewed for driving assistance that uses road-to-vehicle communication between a base station installed on a road and a mobile station installed in a vehicle, vehicle-to-vehicle communication between mobiles stations, and other wireless communications. As information-exchange-type driving assistance technology, for instance, there have been proposed various technologies for extracting information about a vehicle that is highly likely to collide on the basis of received information about other vehicles and providing a driver of a vehicle equipped with such technology (hereinafter referred to as "subject vehicle") with the information or alerting the driver to impending danger in order to prevent a vehicle crash.

For this type of driving assistance, as disclosed in, for instance, Japanese Unexamined Patent Application Publication (JP-A) No. 2008-65480, location information and the like about a subject vehicle and another vehicle (e.g., information about latitude, longitude, azimuth, and the like received through the GPS) is used to perform map-matching (mapping) with road network data from which relative positional relationship of the vehicles on the road is derived in order to determine the likelihood of colliding with the other vehicle.

Japanese Unexamined Patent Application Publication (JP-A) No. 2012-155535 discloses a driver status notification system provided with a notification unit that notifies the driver of the state of another vehicle. Specifically, with reference to FIGS. 1A and 1B and the description of the publication, such a system includes a subject vehicle location detection unit 15*a* that detects the location of the subject vehicle, a driver status acquisition unit 15*b* that acquires a driver status, and a communication unit 15*c* that communicates with the outside of the subject vehicle, while pieces of equipment installed outside the subject vehicle include a wireless station, a server that creates delivery data (delivery data creation unit), and a delivery unit that delivers delivery data to each vehicle. With this arrangement, the notification unit 15*d* notifies the driver of the information about the other vehicle located in the vicinity of the subject vehicle, thereby enabling the driver to drive the subject vehicle safely in accordance with the information about the status of the other vehicle.

Systems disclosed in JP-A No. 2008-65480 and JP-A No. 2012-155535 notify the driver of the subject vehicle of the state of another vehicle near the subject vehicle, thereby enhancing driving safety of the subject vehicle. However, not only the state of another vehicle but also the environment and other factors surrounding the subject vehicle may have a major impact on the safety of the subject vehicle.

SUMMARY OF THE INVENTION

Accordingly, it is an object of the present invention to provide a driving environment risk determination apparatus and a driving environment risk notification apparatus that determine a degree of risk by considering more factors in a comprehensive manner during driving of a vehicle equipped with the apparatuses.

An aspect of the present invention provides a driving environment risk determination apparatus includes a driver status acquisition module that acquires a status of a driver who drives another vehicle running in the vicinity of a subject vehicle that is equipped with the driving environment risk determination apparatus, an other-vehicle status acquisition module that acquires a driving status of the another vehicle, a driving environment acquisition module that acquires a driving environment of the vicinity of the subject vehicle, and a risk determination module that calculates a degree of risk from information acquired by the driver status acquisition module, the other-vehicle status acquisition module, and the driving environment acquisition module and thereby determines whether the degree of risk is minor or major.

Another aspect of the present invention provides a driving environment risk notification apparatus includes a driver status acquisition module that acquires a status of a driver who drives another vehicle running in the vicinity of a subject vehicle that is equipped with the apparatus, an other-vehicle status acquisition module that acquires a driving status of the another vehicle, a driving environment acquisition module that acquires a driving environment of the vicinity of the subject vehicle, a risk determination module that calculates a degree of risk from information acquired by the driver status acquisition module, the other-vehicle status acquisition module, and the driving environment acquisition module and thereby determines whether the degree of risk is minor or major, and a notification module that makes notification to the driver of the subject vehicle in accordance with determination results of the risk determination module.

BRIEF DESCRIPTION OF THE DRAWINGS

FIG. 1A is a block diagram illustrating a configuration of a driving environment risk determination apparatus. FIG. 1B is a plan view illustrating a vehicle provided with a driving environment risk determination apparatus.

FIG. 2A is a diagram illustrating an interior of a vehicle. FIG. 2B is a plan view illustrating vehicles running on a road.

FIG. 3A is a flowchart indicating a method of determining a degree of risk for a driving environment. FIG. 3B is a flowchart detailing a method of determining a degree of risk.

DETAILED DESCRIPTION

A driving environment risk determination apparatus and a driving environment risk notification apparatus according to an example of the present invention are described below. Reference to "left" and "right" sides of the vehicle in the following description is relative to a driver's position.

Figure 1A:
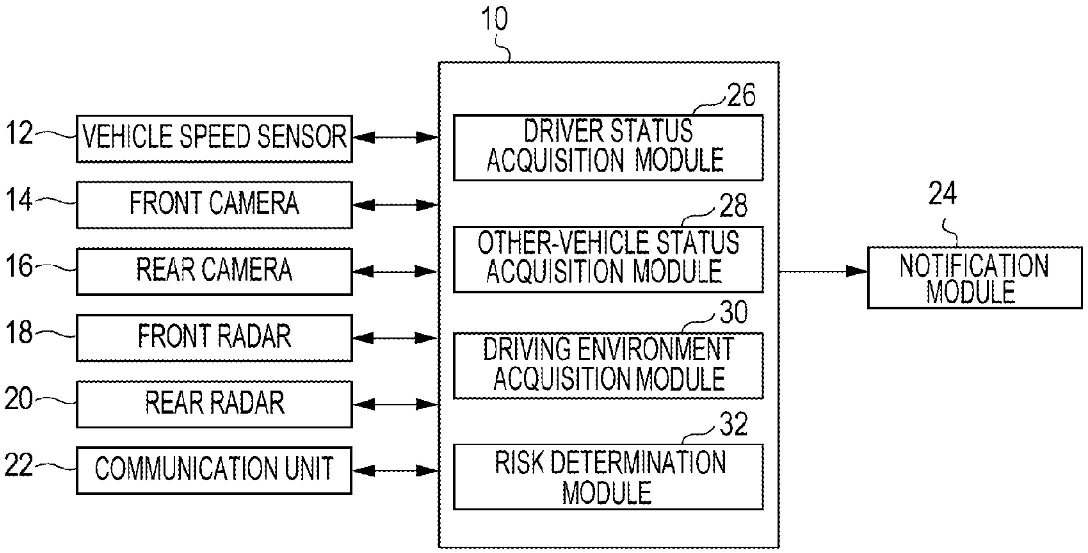
FIGS. 1A and 1B are diagrams illustrating a driving environment risk determination apparatus according to an example of the present invention.
Figure 1B:
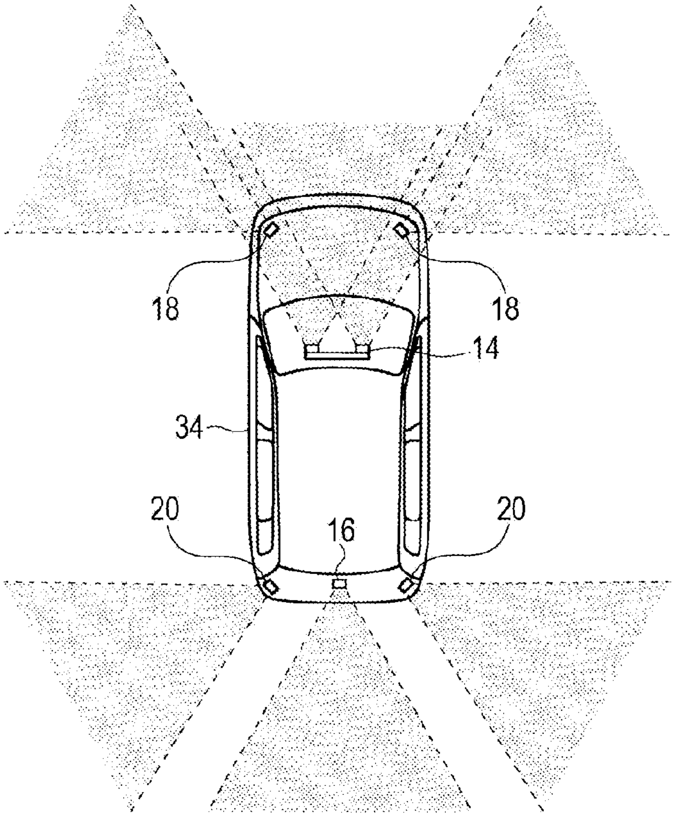

A driving environment risk determination apparatus 10 is described below with reference to FIGS. 1A and 1B. FIG. 1A is a block diagram illustrating a configuration of a driving environment risk determination apparatus 10. FIG. 1B is a plan view illustrating a subject vehicle 34 provided with the driving environment risk determination apparatus 10.

With reference to FIG. 1A, the driving environment risk determination apparatus 10 has a driver status acquisition module 26, an other-vehicle status acquisition module 28, a driving environment acquisition module 30, and a risk determination module 32. Based on the information received from a front camera 14 and the like to be described later, the driving environment risk determination apparatus 10 typically has a function of determining the degree of risk of a surrounding environment in which a driver is driving a vehicle. The driving environment risk determination apparatus 10 having such a function is implemented by an ECU (Electronic Control Unit) consisting of, for instance, a plurality of microcontrollers.

In combination with a notification module 24 to be described later, the driving environment risk determination apparatus 10 according to this example may be used as a driving environment risk notification apparatus that notifies the degree of risk depending on a driving environment.

The driver status acquisition module 26 acquires a status of a driver who drives another vehicle in the vicinity of the subject vehicle 34.

The other-vehicle status acquisition module 28 acquires the status of a vehicle running in the vicinity of the subject vehicle 34.

The driving environment acquisition module 30 acquires information on the driving environment surrounding the subject vehicle 34.

The risk determination module 32 calculates a degree of risk from the information received from the driver status acquisition module 26, the other-vehicle status acquisition module 28, and the driving environment acquisition module 30, and determines whether the degree of risk is minor or major, thereby determining the degree of risk for the driving environment.

The driving environment risk determination apparatus 10 receives various pieces of information from cameras and sensors provided on the vehicle. Specifically, the driving environment risk determination apparatus 10 receives various pieces of information from a vehicle speed sensor 12, a front camera 14, a rear camera 16, front radars 18, rear radars 20, a communication unit 22, and the like, as illustrated in FIG. 1A. These pieces of equipment are described below with reference to FIG. 1B.

The vehicle speed sensor 12 measures a speed of the subject vehicle 34 from the engine rpm or tire rotational speed.

The front camera 14 includes, for instance, a stereo camera mounted close to a windshield on an upper part of a passenger compartment in the subject vehicle 34. The use of the stereo camera enables the calculation of a distance between the subject vehicle 34 and another vehicle or other objects ahead of the subject vehicle 34.

The front radars 18 are mounted at right and left ends of a front end of the subject vehicle 34 and include, for instance, millimeter-wave radars. The use of the front radars 18 enables the calculation of a distance between the subject vehicle 34 and an object present on a forward side of the subject vehicle 34.

The rear camera 16 is disposed at a rear end of the vehicle 34, thereby enabling the detection of an object that is present behind the subject vehicle 34. The rear radars 20 are disposed at right and left ends of a rear end of the subject vehicle 34, enabling the calculation of a distance between the subject vehicle 34 and an object present on a rearward side of the subject vehicle 34.

The communication unit 22 performs road-to-vehicle communication and vehicle-to-vehicle communication. More specifically, the road-to-vehicle communication in which ITS compatible devices are used enables the acquisition of various pieces of information about traffic congestion, weather, and traffic control for specific regions through the reception of light or a radio beacon sent from road ancillary equipment. The vehicle-to-vehicle communication enables mutual communication with other vehicles that are present within an area where communication is allowed through the use of a carrier signal within a predetermined frequency band. The vehicle-to-vehicle communication enables the acquisition of information about, for instance, a vehicle itself, vehicle location, vehicle speed, acceleration, activation of brakes, and activation of blinkers regarding other vehicles. In addition, the vehicle-to-vehicle communication according to this example also enables the acquisition of information about a driver who drives another vehicle, which is described later.

The location of the subject vehicle 34 is measured through the use of radio waves received from the Global Positioning System (GPS) or other satellites.

Determination results from the driving environment risk determination apparatus 10 are applied to the notification module 24. The notification module 24 is a unit that can give a stimulus to the five senses of a driver of the subject vehicle 34. Specifically, the notification module 24 is a unit that gives a stimulus to a driver's sense of vision, hearing, touch, or smell. The notification module 24 includes, for instance, a display screen of a navigation system in which the degree of risk is displayed, thereby notifying the degree of risk to the driver.

Figure 2A:
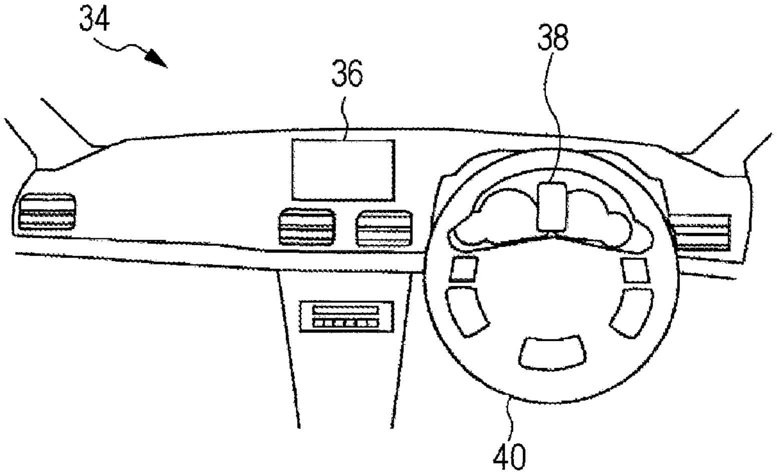
FIGS. 2A and 2B are diagrams illustrating a driving environment risk determination apparatus according to the example of the present invention.

FIG. 2A is a forward view as seen from inside a passenger compartment of the subject vehicle 34. The notification module 24 may include a display 36 disposed transversely in the middle of an instrumental panel or a vehicle information display 38 disposed in front of a steering wheel 40.

Figure 2B:
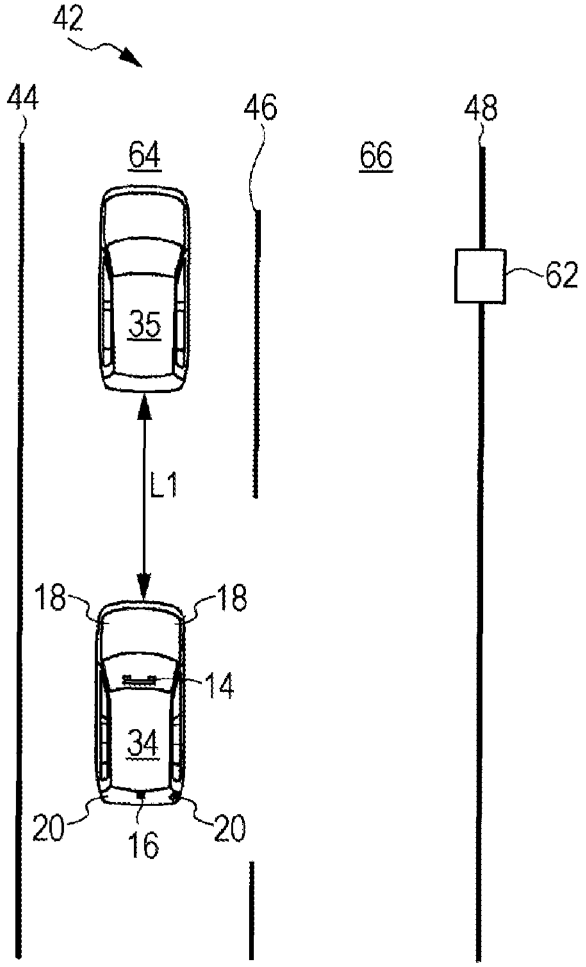

For those other than visual units for alerting the driver to a risk, a unit that transmits vibrations, heat emissions, wind, or the like to the driver may be used as a notification module. The notification module is detailed later with reference to FIGS. 3A and 3B. FIG. 2B illustrates the subject vehicle 34 provided with the driving environment risk determination apparatus 10 that is running on a road 42. The road 42 consists of a lane 64 and a lane 66. A left end of the road 42 is defined by a lane marking 44, while a right end is defined by a lane marking 48. The lane 64 and the lane 66 are separated from each other by a lane marking 46.

The figure illustrates the subject vehicle 34 and another vehicle 35 preceding the subject vehicle 34, both of which are running on the lane 64. The subject vehicle 34 and the another vehicle 35 are away from each other by a distance L1.

As described above, the subject vehicle 34 is provided with the front camera 14 and other sensors. Accordingly, the distance L1 between the subject vehicle 34 and the another vehicle 35 is measured with the front camera 14 or a stereo camera and the front radars 18. In addition to these units, the subject vehicle 34 is provided with the rear camera 16 and the rear radars 20 which also enable the measurement of a distance between the subject vehicle 34 and another vehicle running side by side with or behind the subject vehicle 34.

In this example, the subject vehicle 34 can perform vehicle-to-vehicle communication with the another vehicle 35. In other words, as described above, the subject vehicle 34 and the another vehicle 35 perform mutual communication using a carrier signal within a predetermined frequency band. Through the mutual communication, the subject vehicle 34 can acquire information about the another vehicle 35. Specifically, pieces of information about the vehicle itself, vehicle location, vehicle speed, braking, acceleration, steering wheel operation, activation of blinkers, and the like regarding the another vehicle 35 can be made available. In addition, the subject vehicle 34 can acquire information about a driver who is driving the another vehicle 35. Specifically, pieces of information about a facial expression, body temperature, degree of sweating, driving behavior, and the like regarding the driver of the another vehicle 35 are made available. Such information makes it possible to acquire information about whether the driver of the another vehicle 35 is awake or not. As described later, in this example, the degree of risk is determined by considering pieces of information thus made available in a comprehensive manner.

In this example, the subject vehicle 34 can also perform road-to-vehicle communication. Specifically, by receiving light or a radio beacon sent from a roadside unit 62 disposed at a roadside of the road 42, the subject vehicle 34 can acquire information about the road 42 on which the subject vehicle 34 is running. For instance, pieces of information about traffic congestion of the road 42 on which the subject vehicle 34 is running, weather, traffic control for specific regions, and the like are made available.

Next, a method of determining the degree of risk of the surrounding environment by the vehicle provided with the driving environment risk determination apparatus 10 is described below with reference to FIGS. 3A and 3B and other figures described above.

Figure 3A:
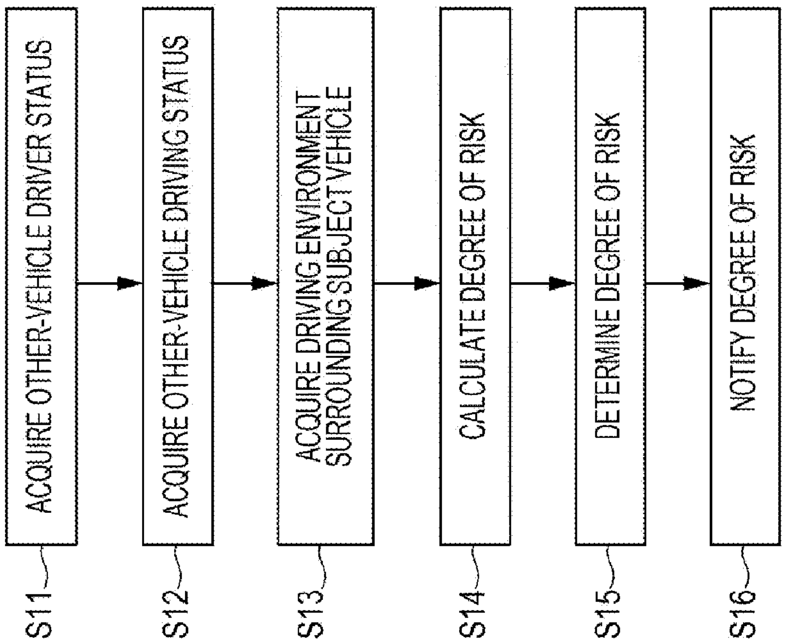
FIGS. 3A and 3B are diagrams illustrating a driving environment risk determination apparatus according to the example of the present invention.
Figure 3B:
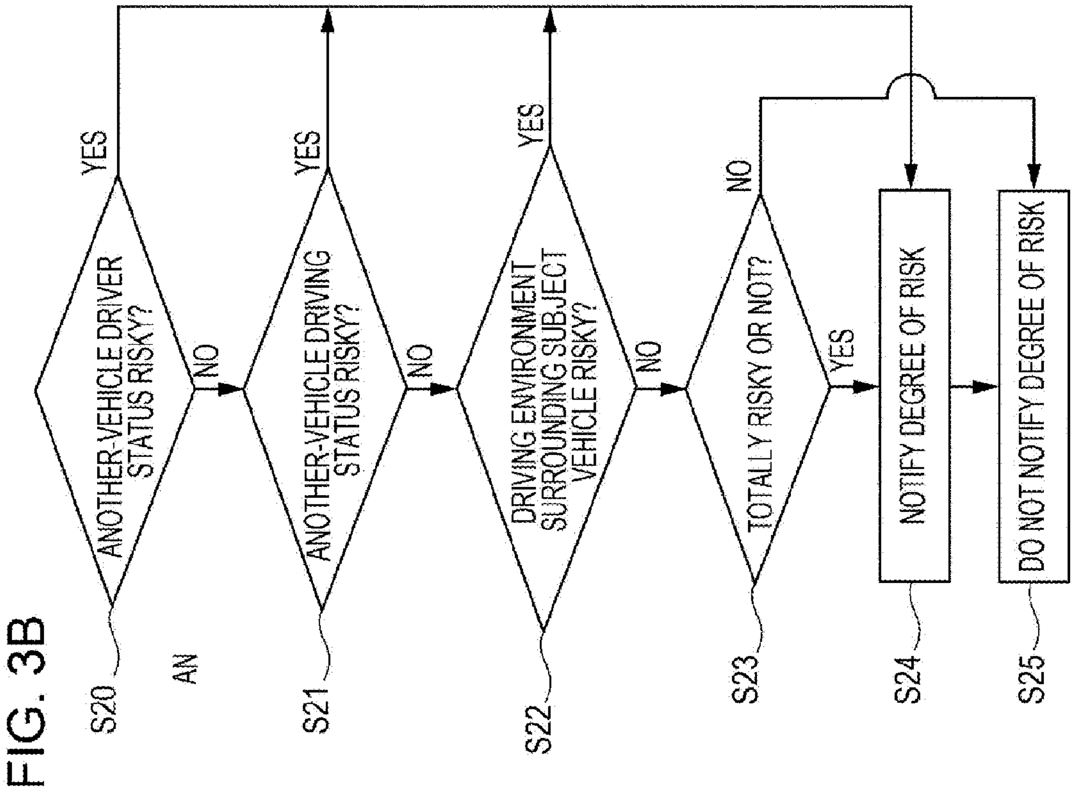

FIG. 3A is a flowchart outlining the entire step of the determination and notification. FIG. 3B is a flowchart detailing steps of determining a degree of risk.

With reference to FIG. 3A, the driver status acquisition module 26 (see FIG. 1A) performs vehicle-to-vehicle communication to acquire a driver status for another vehicle running in the vicinity of the vehicle (step S11). Specifically, with reference to FIG. 2B, the subject vehicle 34 performs vehicle-to-vehicle communication with the another vehicle 35 which is a preceding vehicle using a carrier signal within a predetermined frequency band in order to acquire the driver status of the another vehicle 35. The driver status is, for instance, a facial expression, body temperature, degree of sweating, and operation condition of the driver of the another vehicle 35.

The driver's facial expression is determined by taking a picture of the driver's face with a camera disposed inside the another vehicle 35 and extracting information about the driver's facial expression from the image data obtained by the camera. The driver, if found to be short of wakefulness, is determined to be in an abnormal state.

The driver's body temperature and blood pressure are measured with a sensor mounted on a steering wheel or other portion that comes into direct contact with the driver. Measured body temperature and blood pressure, if found to deviate from a normal range, are determined to be abnormal.

The operation condition of the another vehicle 35 represents information about whether or not the driver of the another vehicle 35 is operating a brake pedal, accelerator pedal, steering wheel, blinker control, or the like. The operation condition is determined to be abnormal when the driver of the another vehicle 35 does not operate the accelerator pedal or steering wheel for more than a predetermined length of time or when the driver's operation condition, if any, differs from a normal operation condition. The operation condition is also determined to be abnormal if the another vehicle 35 fails to make minor corrections to the steering wheel so as to be able to run in alignment with the lane markings 44, 46.

Next, the other-vehicle status acquisition module 28 (see FIG. 1A) performs vehicle-to-vehicle communication in the same manner as above to acquire the driving status of the another vehicle 35 (step S12). Specifically, with reference to FIG. 2B, information on vehicle information, vehicle location, vehicle speed, acceleration, activation of brakes, activation of blinkers, and the like regarding the another vehicle 35 preceding the subject vehicle 34 are made available. The vehicle information includes the size of the another vehicle 35, type of the another vehicle 35, a failure in the vehicle. The another vehicle 35 is determined to be in an abnormal state if its vehicle speed is found to be quite far from a legal speed limit or if found to be malfunctioning.

Next, the driving environment acquisition module 30 (see FIG. 1A) acquires information about a driving environment surrounding the subject vehicle 34 (step S13). Specifically, with reference to FIG. 2B, various pieces of information about the road 42 on which the subject vehicle 34 is running are made available through the reception by the subject vehicle 34 of light or a radio beacon sent from the roadside unit 62 disposed at a roadside of the road 42. Such pieces of information include those about traffic congestion of the road 42, weather, traffic control for specific regions and the like. In this case, only information about the direction in which the subject vehicle 34 is traveling may be included.

Next, from information collected in steps S11, S12, and S13, the degree of risk of the surrounding environment in which the subject vehicle 34 is running is calculated (step S14). Specifically, the information about the driver status, driving status, and driving environment is converted into numerical values for a predetermined calculation, thereby expressing the overall degree of risk in numerical form. For instance, a higher risk corresponds to a higher numerical value.

Next, the risk determination module 32 (see FIG. 1A) determines the degree of risk based on the numerical values obtained by a calculation in step S14 (step S15). A determination method using, for instance, a threshold is conceivable. Specifically, when a numerical value representing the degree of risk calculated in step S14 is greater than a certain threshold, the environment surrounding the subject vehicle 34 is determined to be risky. On the contrary, when such a numerical value is smaller than the threshold, the environment is determined to be not risky. In addition, the determination as to the degree of risk may be carried out in a step-by-step manner. In other words, a positive correlation may be given to a relationship between the calculated numerical value and the degree of risk to be notified.

Next, the degree of risk is notified to the driver of the subject vehicle 34, if needed (step S16). As the notification module 24 (see FIG. 1A), a unit that gives a stimulus to a driver's sense of vision, hearing, touch, or smell is used. For notification through the driver's sense of vision, a screen of a navigation system, for instance, is used to indicate the degree of risk. For notification through the driver's sense of hearing, a speaker, for instance, is provided on the subject vehicle 34 to deliver an audible warning indicating the degree of risk. For notification through driver's sense of touch, a steering wheel or a seat in constant contact with the driver, for instance, is configured to be vibrated. For notification through the driver's sense of smell, a smell different from the passenger compartment smell is generated.

With reference to the flowchart in FIG. 3B, step S14 for calculating the degree of risk and step S15 for determining the degree of risk are detailed below.

First, it is determined whether or not the status of a driver of the another vehicle 35 running in the vicinity of the subject vehicle 34 illustrated in FIG. 2B (step S20) is safe. Specifically, with reference to FIG. 2B, through the process of vehicle-to-vehicle communication the subject vehicle 34 acquires information about the facial expression and the like of the driver of the another vehicle 35 and performs a predetermined calculation based on such information to convert the driver status into a numerical value. If such a numerical value is not less than a predetermined level, the status of the driver of the another vehicle 35 is determined to be not safe ("YES" in step S20) and notification of the degree of risk is performed in step S24 to be described later. For such notification, a section of the road that the subject vehicle 34 is moving toward is marked with an easily recognizable color. For instance, a section of the road between the subject vehicle 34 and the another vehicle 35 is marked with a red color or other easily recognizable colors as a risky section.

If it is predicted from the facial expression of the driver of the another vehicle 35 that the driver is drowsy, notification of the degree of risk is performed even if other factors to be described later are determined to be safe. On the contrary, if the degree of risk for the other driver's driver status is less than a certain level ("NO" in step S20), the flow proceeds to step S21.

As illustrated in FIG. 2B, it is determined through the vehicle-to-vehicle communication in step S21 whether or not the driving status of the another vehicle 35 preceding the subject vehicle 34 is risky. In this step, the information about the speed and state of the another vehicle 35 is acquired and used to perform a predetermined calculation, thereby converting the degree of risk for the driving status of the another vehicle 35 into a numerical value. For instance, if it is determined through the vehicle-to-vehicle communication that the vehicle 35 is faulty or meandering, a higher degree of risk will result. If the degree of risk converted into a numerical value is not less than a certain level ("YES" in step S21), the driver of the subject vehicle 34 is notified that the driving status for the another vehicle 35 is risky (step S24). In contrast, if the degree of risk is less than a certain level, the flow proceeds to step S22 ("NO" in step S21).

In step S22, information about traffic congestion of a section of the road 42 which the subject vehicle 34 is traveling toward is acquired from the roadside unit 62 illustrated in FIG. 2B. Then, a predetermined calculation is performed from the acquired information. If the resultant numerical value indicating the degree of risk is not less than a certain level ("YES" in step S22), notification of the degree of risk is performed (step S24). For instance, when the presence of a traffic accident or a faulty vehicle is received through the road-to-vehicle communication, a higher degree of risk will result. On the contrary, when the numerical value indicating the degree of risk for the driving environment is less than a certain level, the flow proceeds to step S23.

In step S23, the degree of risk for the environment in which the vehicle is running is determined in a comprehensive manner through an overall calculation based on the numerical value indicating the degree of risk described above. Specifically, an overall degree of risk is calculated through arithmetic processing (e.g., addition) based on numerical values indicating the degree of risk obtained by calculations in steps S20, S21, and S22. If the numerical value indicating the calculated overall degree of risk is not less than a certain level ("YES" in step S23), the fact that the vehicle is overall in a risky state is notified (step S24). In contrast, if the numerical value indicating the overall degree of risk is less than a certain level ("NO" in step S23), no notification of the degree of risk is performed (step S25).

The arithmetic processing performed in step S23 takes into consideration in a comprehensive manner the another driver status of the another vehicle 35, the driving status of the another vehicle 35, and the driving environment around the vehicle. These factors may be treated on an equal basis or weighted on an unequal basis. When these factors are unequally treated, the driver status of the another vehicle 35, for instance, is converted into numerical values ranging from 1 to 10, while the other factors are converted into numerical values ranging from 1 to 5. Then, these numerical values are added to give the overall degree of risk. Doing this practice places an emphasis on the driver status of the another vehicle 35, which promotes safety-oriented driving.

Figure 4:
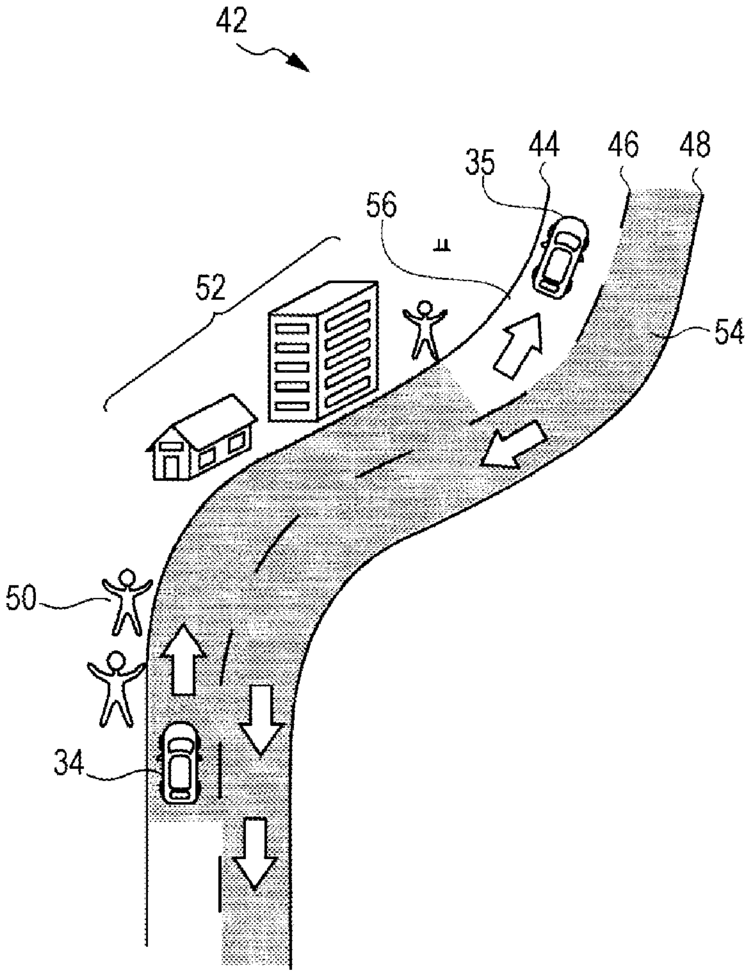
FIG. 4 is a schematic diagram of a driving environment risk determination apparatus according to the example of the present invention, indicating a method of indicating a degree of risk.
Figure 5:
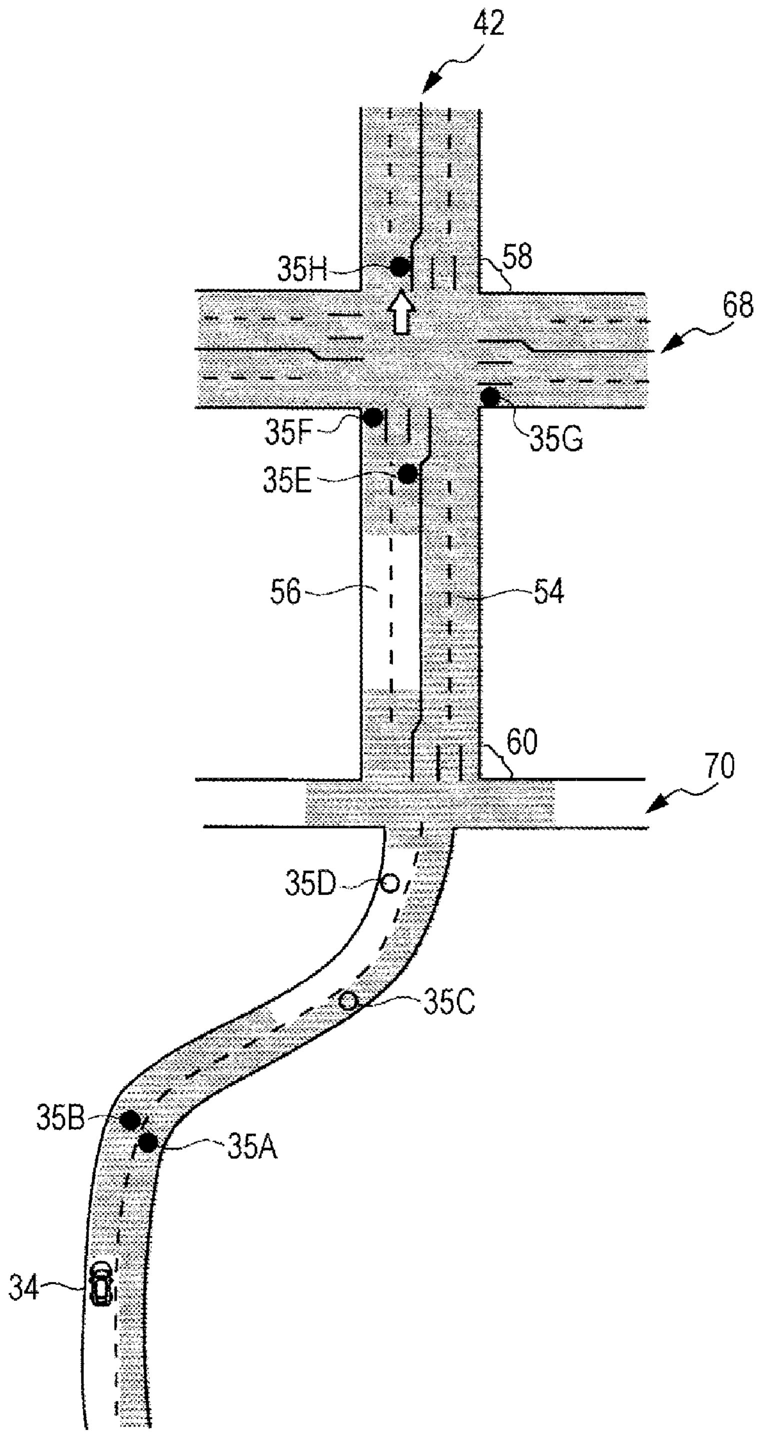
FIG. 5 is a schematic diagram illustrating a driving environment risk determination apparatus according to the example of the present invention, indicating a method of indicating a degree of risk.

FIGS. 4 and 5 demonstrate the case in which a car navigation system is used as a unit that notifies the driver of the vehicle of the degree of risk. FIGS. 4 and 5 illustrate a screen of a navigation system in which a degree of risk is superposed onto a map display.

With reference to FIG. 4, a display screen of a car navigation system illustrated in the figure displays the subject vehicle 34 running on the road 42 together with buildings and humans 50 around the road 42.

In this example, a section (risky section 54) of the road 42 determined by the driving environment risk determination apparatus to be highly risky is indicated by hatching. In an actual display screen, since notification of the degree of risk is performed by a colored marking, the risky section 54 is indicated by, for instance, a red-colored marking. On the contrary, a non-risky section 56 determined to be not risky has no hatching. In an actual display screen, the non-risky section 56 is indicated by, for instance, a green or gray colored marking which evokes an image of a normal street.

More specifically, a section determined according to map data to be an opposite traffic lane is indicated by hatching corresponding to a higher degree of risk. Likewise, a section determined according to map data to be adjacent to an urban area 52 is also indicated by hatching. Furthermore, a section of the road 42 where a human 50 (pedestrian) is determined through road-to-vehicle communication to be present on the side walk is also indicated by hatching. This is because there is a risk of the human 50 suddenly running into the road 42 in such a section. Specifically, even if a section of the road between the subject vehicle 34 and the another vehicle 35 is basically found to be not risky, any section of the road where the human 50 is recognizable on the side walk is indicated as the risky section 54.

As described above, the use of the notification of the degree of risk through a color marking on the road 42 on which the subject vehicle 34 is running informs the driver of the subject vehicle 34 of the degree of risk of the road 42 in advance, promoting safer driving.

FIG. 5 illustrates a screen described above displaying a map of a wider area including the road 42. In this figure, the road 42 extends vertically, while a road 68 and a road 70 extend horizontally. The road 42 and the road 68 intersect with each other at an intersection 58, while the road 42 and the road 70 intersect with each other at an intersection 60. In addition, other vehicles running on the road 42 are indicated by dots in the figure.

As is the case with FIG. 4, the road 42 and the like are color-coded according to the non-risky section 56 of a lower degree of risk and the risky section 54 of a higher degree of risk. The range of the risky section 54 may be defined on the basis of the vehicle-to-vehicle communication with the another vehicle 35A and the like in addition to the above-mentioned map data and the road-to-vehicle communication. In other words, if the driving status or driver status of the another vehicle 35A is determined to be risky from the vehicle-to-vehicle communication between the subject vehicle 34 and the another vehicle 35A, a section of the road 42 between the another vehicle 35A and the vehicle 34 is indicated by hatching.

In addition, the manner in which the another vehicle 35A and the like are displayed is configured to vary with the degree of risk. Specifically, the another vehicles 35A, 35B, 35E, 35F, 35G, and 35H whose degree of risk is determined to be high are represented by black dots, while the another vehicles 35C, 35D whose degree of risk is determined to be low are indicated by white dots. Configuring the indication of the another vehicle 35A to vary with the degree of risk makes it possible to inform the driver of the degree of risk of the another vehicle 35A in an accurate fashion, thereby enabling the driver to move away from the highly risky another vehicle 35A or take other measures for risk avoidance.

Furthermore, the indication of the degree of risk may be configured to vary with the information about the intersections 58, 60 obtained through the road-to-vehicle communication. For instance, if the information about a signal installed at the intersection 60 acquired through the road-to-vehicle communication tells that the signal at the intersection 60 is red when the subject vehicle 34 is about to approach the intersection 60, an area around the intersection 60 may be indicated as the risky section 54. In addition, the speed of the subject vehicle 34 may be controlled in accordance with the information in such a manner that the subject vehicle 34 approaches the intersection 60 while the signal of the intersection 60 is green.

The degree of risk of the road 42 may be calculated by taking its width (road width) into consideration. For instance, the degree of risk for a two-lane section of the road 42 may be determined to be higher than that for a four-lane section. With this arrangement, a narrower section of the road 42 is marked with a higher degree of risk, which enhances the safety for that section.

In addition, the degree of risk of the road 42 may be calculated by taking into consideration the direction of vehicles traveling in an adjacent lane. In other words, the subject vehicle 34 is notified of a higher degree of risk if running on one lane of a two-lane road with another vehicle on the other adjacent lane traveling in the opposite direction of the subject vehicle 34. In contrast, the subject vehicle 34 is notified of a relatively lower degree of risk if the subject vehicle 34 is running on a four-lane road and another vehicle on a lane adjacent to the lane of the subject vehicle 34 is traveling in the same direction as the subject vehicle 34. This arrangement makes it possible to notify the degree of risk according to the road on which the subject vehicle 34 is running.

The degree of risk of the road 42 is determined in a comprehensive manner based on map data and information acquired through vehicle-to-vehicle communication and road-to-vehicle communication, thereby enabling the driver to be more accurately notified of the degree of risk.

With reference to FIG. 2B, though the degree of risk is determined according to the situations of the subject vehicle 34, the another vehicle 35, and the road 42, but the degree of risk may be determined by considering the following information in addition to the situations.

With reference to FIG. 2B, the degree of risk may be determined by considering a distance L1 between the subject vehicle 34 and the another vehicle 35. In other words, if the driver of the preceding another vehicle 35 has wakefulness falling below a certain level and the distance L1 is not more than a predetermined level, a section between the subject vehicle 34 and the another vehicle 35 is determined as a risky section. The distance L1 between the subject vehicle 34 and the another vehicle 35 is measured with the front camera 14 and the front radars 18 mounted on the front of the subject vehicle 34. With this arrangement, the fact that the distance between the subject vehicle 34 and the another vehicle 35 is risky is notified to the driver, which enhances the capabilities to avoid a crash.

In addition, since a shorter distance L1, if determined, indicates a situation where the subject vehicle 34 is gradually approaching the another vehicle 35, a further higher degree of risk may be indicated for the section between the subject vehicle 34 and the another vehicle 35. For instance, it is conceivable that the section between the subject vehicle 34 and the another vehicle 35 is marked with a red color. With this arrangement, the capabilities to avoid a crash can be further enhanced.

With reference to FIG. 4, if it is determined from the detection by cameras or radars mounted on the subject vehicle 34 that the human 50 or other moving object in front of or around the subject vehicle 34 is approaching the subject vehicle 34, the subject vehicle 34 may be determined to have a higher degree of risk. If this occurs, a section of the road between the subject vehicle 34 and the another vehicle 35 which lies ahead of the subject vehicle 34, for instance, is determined to be redder than other sections. With this arrangement, a higher degree of risk is notified to the driver.

If fire engine or other emergency vehicle is detected in the vicinity of the subject vehicle 34, a section of the road 42 between the emergency vehicle and the subject vehicle 34 may be determined as an attention section to which attention should be paid. The attention section is treated separately from the risky section described above. The detection of the emergency vehicle is performed through road-to-vehicle communication, cameras mounted on the subject vehicle 34, or the like. This enables the subject vehicle 34 to run so as to avoid the course of an emergency vehicle.

This example described above can be modified as follows:

In the example described above, when a degree of risk converted into a numerical value is not less than a certain level, notification of the degree of risk is performed, but notification of the degree of risk may be performed in a phased manner according to the numerical value representing the degree of risk. For instance, in the case of visual notification of the degree of risk, a lower degree of risk may be indicated by a blue color, while a higher degree of risk may be indicated by a red color.

With reference to FIG. 3A, the vehicle-to-vehicle communication is performed only with the another vehicle 35, namely, the preceding vehicle illustrated in FIG. 2B in steps S11 and S12. The vehicle-to-vehicle communication, however, may be used to acquire the status of a vehicle side by side with or behind the subject vehicle 34, in addition to the another vehicle 35.

Though the information about the driver status and driving status of the another vehicle 35 is acquired through the vehicle-to-vehicle communication in steps S11 and S12 illustrated in FIG. 3A, the front camera 14 and the like mounted on the subject vehicle 34 illustrated in FIG. 2B may be used to acquire the information about the another vehicle 35. In such a case, the front camera 14 is used to acquire the information about the behavior (speed, acceleration, and steering behavior) of the another vehicle 35.

In the foregoing explanation, the degree of risk is calculated based on the state of the another vehicle 35 and the road 42, as illustrated in FIG. 2B. In addition to this, the degree of risk may be calculated by considering the driving status and driver status of the subject vehicle 34 as well. For instance, if the wakefulness calculated from the facial expression of the driver of the subject vehicle 34 is at a lower level, the degree of risk may be determined to be totally higher.

With reference to FIG. 2A, the display 36 of a car navigation system is used as a notification module in the foregoing explanation, but other units may be used as a visual notification module. For instance, a flashing light disposed in the passenger compartment may be used as a notification module.

The driving environment risk determination apparatus according to the example and modification of the present invention determines the degree of risk for the subject vehicle from the situation surrounding the subject vehicle in addition to the state of other vehicles running in the vicinity of the subject vehicle. Consequently, the degree of risk can be determined in a comprehensive manner, enabling the driver of the subject vehicle to more safely drive the vehicle on the basis of the degree of risk.

In addition, the driving environment risk determination apparatus according to the example and modification of the subject invention notifies the driver of the degree of risk for the subject vehicle from the situation surrounding the subject vehicle in addition to the state of other vehicles running in the vicinity of the subject vehicle. Consequently, the degree of risk can be determined in a comprehensive manner, enabling the driver of the subject vehicle to more safely drive the vehicle on the basis of the degree of risk.

The invention claimed is:

1. A vehicle with a driving environment risk determination apparatus comprising:

a communication unit configured for vehicle-to-vehicle communication;

one or more sensors arranged to detect driving environment information in the vicinity of the subject vehicle; and one or more controllers, configured to:

acquire a status information of a driver who drives another vehicle running in the vicinity of a subject vehicle that is equipped with the driving environment risk determination apparatus via a vehicle-to-vehicle communication with the another vehicle by the communication unit, wherein the status information of the driver who drives another vehicle includes information on at least one of a facial expression of the driver of the another vehicle, a body temperature of the driver of the another vehicle, a degree of sweating of the driver of the another vehicle, and an operation condition of one or more of a brake pedal of the another vehicle, an accelerator pedal of the another vehicle, a steering wheel of the another vehicle, and a blinker control of the another vehicle by the driver of the another vehicle;

acquire a driving status information of the another vehicle via a vehicle-to-vehicle communication with the another vehicle by the communication unit, wherein the driving status information of the another vehicle includes information on at least one of location of the another vehicle, speed of the another vehicle, acceleration of the another vehicle, activation of brakes of the another vehicle, activation of blinkers of the another vehicle, vehicle size of the another vehicle, vehicle type of the another vehicle, and a failure in the another vehicle;

acquire a driving environment information in the vicinity of the subject vehicle detected by the one or more sensors;

convert the status information of the driver who drives the another vehicle into a first numerical value, the driving status information of the another vehicle into a second numerical value, and the driving environment information in the vicinity of the subject vehicle into a third numerical value;

calculate a degree of risk of the surrounding environment in which the subject vehicle is running from at least the first numerical value, the second numerical value, and the third numerical value; and determine whether a surrounding environment in which the subject vehicle is running is risky or not risky by comparing the degree of risk to a threshold.

2. The driving environment risk determination apparatus according to claim 1, wherein the one or more controllers are configured to:

calculate a first degree of risk from the status information of the driver who drives the another vehicle;

calculate a second degree of risk from the driving status information of the another vehicle;

calculate a third degree of risk from the driving environment information in the vicinity of the subject vehicle; and calculate an overall degree of risk from the first degree of risk, the second degree of risk, and the third degree of risk.

3. The driving environment risk determination apparatus according to claim 2, wherein the one or more controllers are configured to assign weights to the status information of the driver who drives the another vehicle, the driving status information of the another vehicle, and the driving environment information, respectively, before calculating the overall degree of risk.

4. The driving environment risk determination apparatus according to claim 1, wherein, if the status information of a driver who drives the another vehicle indicates that wakefulness of the driver of the another vehicle is degrading and a vehicle-to-vehicle distance from the subject vehicle to the another vehicle is not more than a predetermined level, the one or more controllers determine the section between the subject vehicle and the another vehicle as a risky section.

5. The driving environment risk determination apparatus according to claim 1, wherein the one or more controllers are configured to increase the degree of risk when detecting the presence of a pedestrian or an urban area along a section of a road that is between the subject vehicle and the another vehicle and lies in the direction in which the subject vehicle travels.

6. The driving environment risk determination apparatus according to claim 1, wherein the one or more controllers are configured to increase the degree of risk when the vehicle-to-vehicle distance between the subject vehicle and the another vehicle becomes shorter.

7. The driving environment risk determination apparatus according to claim 1, wherein the one or more controllers are configured to increase the degree of risk when a moving object in the vicinity of the subject vehicle is approaching the subject vehicle.

8. The driving environment risk determination apparatus according to claim 1, wherein, when detecting an emergency vehicle in the vicinity of the subject vehicle and detecting that the emergency vehicle is approaching the subject vehicle, the one or more controllers are configured to determine a section of a road between the emergency vehicle and the subject vehicle as an attention-state section.

9. A vehicle comprising:

a driving environment risk notification apparatus including one or more controllers configured to:

acquire a status information of a driver who drives another vehicle running in the vicinity of a subject vehicle equipped with the driving environment risk notification apparatus via a vehicle-to-vehicle communication with the another vehicle, wherein the status information of the driver who drives another vehicle includes information on at least one of a facial expression of the driver of the another vehicle, a body temperature of the driver of the another vehicle, a degree of sweating of the driver of the another vehicle, and an operation condition of a brake pedal, an accelerator pedal, a steering wheel, a blinker control by the driver of the another vehicle;

acquire a driving status information of the another vehicle wherein the driving status information of the another vehicle includes information on at least one of location of the another vehicle, speed of the another vehicle, acceleration of the another vehicle, activation of brakes of the another vehicle, activation of blinkers of the another vehicle, vehicle size of the another vehicle, vehicle type of the another vehicle and a failure of the another vehicle;

acquire a driving environment information in the vicinity of the subject vehicle; and convert the status information of the driver who drives the another vehicle into a first numerical value, the driving status information of the another vehicle into a second numerical value, and the driving environment information in the vicinity of the subject vehicle into a third numerical value;

calculate a degree of risk of the surrounding environment in which the subject vehicle is running from at least the first numerical value, the second numerical value, and the third numerical value;

determine whether a surrounding environment in which the subject vehicle is running is risky or not risky by comparing the degree of risk to a threshold; and a notification unit that provides notification to the driver of the subject vehicle if at least one of the controllers determines the surrounding environment is risky, wherein the notification unit is one or more of a display configured to display a visual notification, a speaker configured to deliver an audible warning, a vibration device in contact with a driver configured to vibrate, or scent releaser configured to generate a smell.

10. The vehicle according to claim 9, wherein the notification unit provides a visual notification to the driver of the subject vehicle.

11. The vehicle according to claim 9, wherein the notification unit is a display disposed inside a passenger compartment of the subject vehicle.

12. The vehicle according to claim 11, wherein the display makes a notification with a changing color on a map screen indicating a road on which the subject vehicle is running.

13. The vehicle according to claim 9, wherein the one or more controllers are configured to calculate a first degree of risk from the status information of the driver who drives the another vehicle, and the notification unit indicates the another vehicle as being in a risky state when the first degree of risk is not less than a predetermined level.

14. The vehicle according to claim 9, wherein, when detecting the presence of a pedestrian on the side of a section of a road, the notification unit indicates the section as a risky section.

15. The vehicle according to claim 9, wherein the notification unit indicates the degree of risk of a road on which the subject vehicle is running, and wherein the degree of risk of the road is calculated by taking into consideration the direction of vehicles traveling in an adjacent lane.

16. The vehicle according to claim 9, wherein the notification unit indicates the degree of risk of a road on which the subject vehicle is running, and the degree of risk of the road is calculated by taking into consideration the width of the road.

17. The vehicle according to claim 9, wherein the notification unit is a car navigation system in which display a map and one or more marks indicating the degree of risk superposed onto the map.

18. A vehicle with a driving environment risk determination apparatus comprising:

a communication unit configured for vehicle-to-vehicle communication;

one or more sensors arranged to detect driving environment information in the vicinity of the subject vehicle; and one or more controllers, configured to:

acquire a status information of a driver who drives another vehicle running in the vicinity of a subject vehicle that is equipped with the driving environment risk determination apparatus via a vehicle-to-vehicle communication with the another vehicle by the communication unit, wherein the status information of the driver who drives another vehicle includes information on at least one of a facial expression of the driver of the another vehicle, a body temperature of the driver of the another vehicle, and a degree of sweating of the driver of the another vehicle;

acquire a driving status information of the another vehicle via a vehicle-to-vehicle communication with the another vehicle by the communication unit, wherein the driving status information of the another vehicle includes information on at least one of location of the another vehicle, speed of the another vehicle, acceleration of the another vehicle, activation of brakes of the another vehicle, activation of blinkers of the another vehicle, vehicle size of the another vehicle, vehicle type of the another vehicle and a failure in the another vehicle;

acquire a driving environment information in the vicinity of the subject vehicle detected by the one or more sensors;

convert the status information of the driver who drives the another vehicle into a first numerical value, the driving status information of the another vehicle into a second numerical value, and the driving environment information in the vicinity of the subject vehicle into a third numerical value;

calculate a degree of risk of the surrounding environment in which the subject vehicle is running from at least the first numerical value, the second numerical value and the third numerical value; and determine whether a surrounding environment in which the subject vehicle is running is risky or not risky by comparing the degree of risk to a threshold.

19. A vehicle comprising:

a driving environment risk notification apparatus including one or more controllers configured to:

acquire a status information of a driver who drives another vehicle running in the vicinity of a subject vehicle equipped with the driving environment risk notification apparatus via a vehicle-to-vehicle communication with the another vehicle, wherein the status information of the driver who drives another vehicle includes information on at least one of a facial expression of the driver of the another vehicle, a body temperature of the driver of the another vehicle, and a degree of sweating of the driver of the another vehicle;

acquire a driving status information of the another vehicle, wherein the driving status information of the another vehicle includes information on at least one of location of the another vehicle, speed of the another vehicle, acceleration of the another vehicle, activation of brakes of the another vehicle, activation of blinkers of the another vehicle, vehicle size of the another vehicle, vehicle type of the another vehicle and a failure of the another vehicle;

acquire a driving environment information in the vicinity of the subject vehicle;

convert the status information of the driver who drives the another vehicle into a first numerical value, the driving status information of the another vehicle into a second numerical value, and the driving environment information in the vicinity of the subject vehicle into a third numerical value;

calculate a degree of risk of the surrounding environment in which the subject vehicle is running from at least the first numerical value, the second numerical value and the third numerical value;

determine whether a surrounding environment in which the subject vehicle is running is risky or not risky by comparing the degree of risk to a threshold, and a notification unit that provides notification to the driver of the subject vehicle if at least one of the controllers determines the surrounding environment is risky, wherein the notification unit is one or more of a display configured to display a visual notification, a speaker configured to deliver an audible warning, a vibration device in contact with a driver configured to vibrate, or scent releaser configured to generate a smell.

* * * * *